United States Patent
Ferrari et al.

(10) Patent No.: US 7,163,098 B2
(45) Date of Patent: Jan. 16, 2007

(54) VARIABLE-CAPACITY FIFO STORE WITH AN EXPULSION STATION

(75) Inventors: Michele Ferrari, Bologna (IT); Sauro Uccellari, Bologna (IT); Alessandro Minarelli, Bazzano (IT)

(73) Assignee: G.D. Societa' per Azioni (IT)

( * ) Notice: Subject to any disclaimer, the term of this patent is extended or adjusted under 35 U.S.C. 154(b) by 0 days.

(21) Appl. No.: 11/065,884

(22) Filed: Feb. 25, 2005

(65) Prior Publication Data
US 2005/0199469 A1 Sep. 15, 2005

(30) Foreign Application Priority Data
Feb. 27, 2004 (IT) .......................... BO2004A0119

(51) Int. Cl.
*B65G 21/18* (2006.01)
(52) U.S. Cl. .................................. 198/347.1
(58) Field of Classification Search ............. 198/347.1, 198/347.2, 347.3, 778, 370.07
See application file for complete search history.

(56) References Cited

U.S. PATENT DOCUMENTS

| | | | | |
|---|---|---|---|---|
| 3,869,115 | A | * 3/1975 | Barkley | 271/147 |
| RE30,964 | E | * 6/1982 | Butner et al. | 209/536 |
| 4,369,873 | A | * 1/1983 | Heuft | 198/367 |
| 4,392,767 | A | * 7/1983 | Ischebeck | 209/559 |
| RE32,001 | E | * 10/1985 | Wahle | 414/416.05 |
| 6,065,585 | A | * 5/2000 | Bryant et al. | 198/347.1 |
| 6,209,169 | B1 | * 4/2001 | Dilger et al. | 15/387 |
| 6,793,062 | B1 | * 9/2004 | Hammock et al. | 198/347.1 |
| 2002/0095912 | A1 | 7/2002 | Focke et al. | |

FOREIGN PATENT DOCUMENTS

WO WO 03/026988 A1 4/2003

OTHER PUBLICATIONS

Search Report issued by European Patent Office on Jul. 12, 2005 in connection with corresponding PCT application No. 05101238.3-2308.

* cited by examiner

*Primary Examiner*—Gene O. Crawford
*Assistant Examiner*—Mark A. Deuble
(74) *Attorney, Agent, or Firm*—Ostrolenk, Faber, Gerb & Soffen, LLP

(57) ABSTRACT

A variable-capacity FIFO store having a powered endless conveyor belt defining a conveying branch for transferring a mass of articles from an input station to an output station, and a return branch extending from the output station to the input station; and an adjusting assembly for adjusting the lengths of the conveying and return branches in complementary manner, so as to adjust the storage capacity of the store; an expulsion station is located along an output conveyor, downstream from the output station, to expel a given mass of articles from the output conveyor, and is controlled by a control unit for identifying the location of a mass of articles in the store, and for activating the expulsion station when the previously identified mass of articles travels through the expulsion station.

20 Claims, 5 Drawing Sheets

VARIABLE-CAPACITY FIFO STORE WITH AN EXPULSION STATION

The present invention relates to a variable-capacity FIFO store.

The present invention may be used to advantage in a variable-capacity FIFO cigarette store, to which the following description refers purely by way of example.

BACKGROUND OF THE INVENTION

In cigarette packing, a variable-capacity FIFO (First In First Out) cigarette store is interposed between a cigarette manufacturing machine and a packing machine to compensate for any difference between the number of cigarettes produced and the number of cigarettes packed.

One example of a variable-capacity FIFO cigarette store is described in Patent EP-0738478-B1, U.S. Pat. No. 5,413,213-A1, Patent Application WO-9944446-A1, Patent Application WO-02085144-A1, and Patent Application WO-03026988-A1, in which the store comprises an input station and an output station arranged in series along a cigarette feed path; an endless conveyor belt having a conveying branch and a return branch; and an adjusting device for adjusting the lengths of the conveying and return branches in complementary manner. The conveyor belt is powered by at least one electric motor to feed the cigarettes along the conveying branch, and engages a number of fixed guides for maintaining the conveyor belt in the desired position. The conveying branch of the store receives a stream of cigarettes from an output conveyor of a manufacturing machine connected to the store at the input station, and releases a stream of cigarettes onto an input conveyor of a packing machine connected to the store at the output station.

Both the manufacturing and packing machine have respective cigarette reject stations controlled by sensors, which check the quality of the cigarettes passing through and command rejection of any cigarettes or groups of cigarettes not conforming with specifications. The cigarette reject stations can also be operator-controlled manually, regardless of the sensor signals, to eliminate given portions of current production. Manual operator control of the cigarette reject stations (particularly on the packing machine) is adopted, for example, when making size changes on the manufacturing machine, which normally involves eliminating the cigarettes produced just before and after the size change.

Manual operation of the cigarette reject stations is a complex, difficult job, even for a skilled operator, owing to the difficulty involved, mainly on account of the high speed at which the cigarettes are fed through the machines, in communicating to the packing (or manufacturing) machine the exact moment in which to perform the reject operation.

SUMMARY OF THE INVENTION

It is an object of the present invention to provide a variable-capacity FIFO store designed to eliminate the aforementioned drawbacks, and which in particular is cheap and easy to implement.

According to the present invention, there is provided a variable-capacity FIFO store comprising an input station located at an input conveyor; an output station located at an output conveyor; a powered endless conveyor belt defining a conveying branch for transferring a mass of articles from the input station to the output station, and a return branch extending from the output station to the input station; and an adjusting assembly for adjusting the lengths of the conveying and return branches in complementary manner, so as to adjust the storage capacity of the store; the store being characterized by comprising an expulsion station located along the output conveyor, downstream from the output station, to expel a given mass of articles from the output conveyor; and by comprising a control unit for identifying the location of a mass of articles in the store, and for activating the expulsion station when the previously identified mass of articles travels through the expulsion station.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
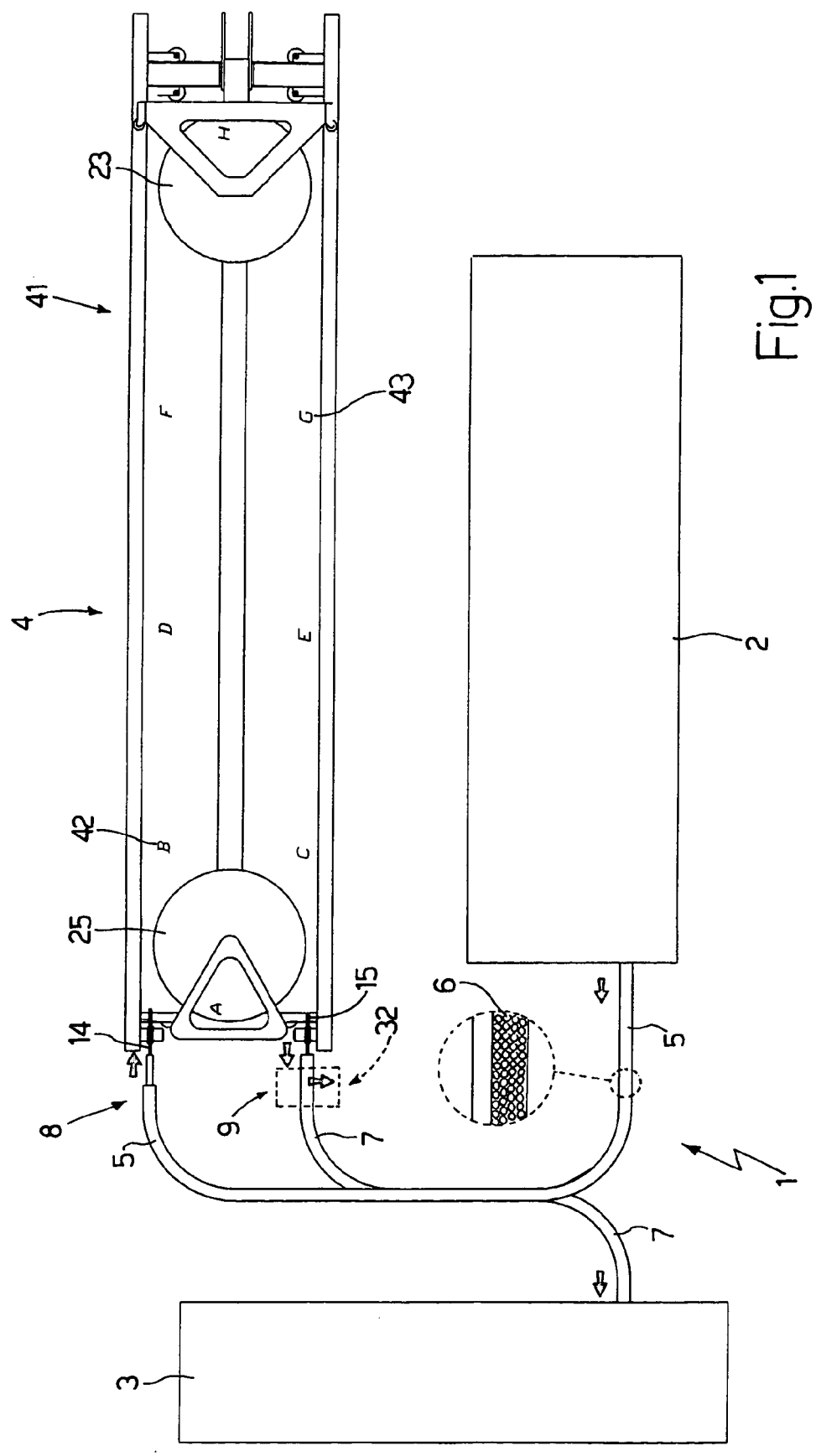
FIG. 1 shows a plan view of a cigarette manufacturing and packing system featuring the variable-capacity FIFO store according to the present invention.

Number 1 in FIG. 1 indicates as a whole a system for producing packets of cigarettes (not shown in detail). System 1 comprises a cigarette manufacturing machine 2; a cigarette packing machine 3; and a variable-capacity FIFO cigarette store 4 interposed between manufacturing machine 2 and packing machine 3 by means of an input conveyor 5 for receiving a mass of cigarettes 6 from an output of manufacturing machine 2, and an output conveyor 7 for feeding a mass of cigarettes 6 to an input of packing machine 3.

Store 4 comprises an input station 8 located at input conveyor 5; and an output station 9 located at output conveyor 7. In actual use, store 4 receives a mass of cigarettes 6 in bulk in the form of a continuous stream at input station 8, and supplies a mass of cigarettes 6 to output station 9.

Figure 2:
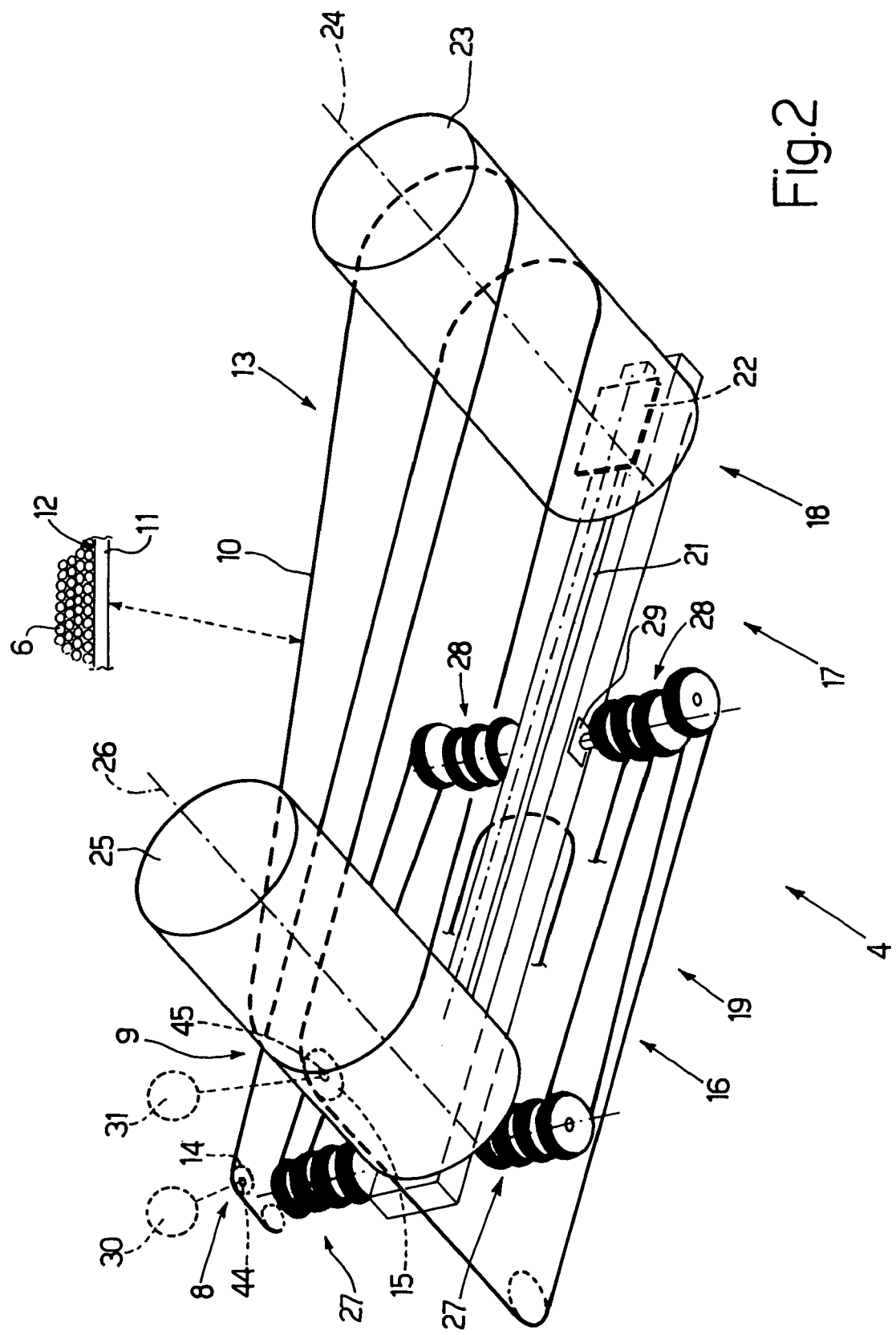
FIG. 2 shows a schematic view in perspective, with parts removed for clarity, of the FIG. 1 store.

As shown in FIG. 2, store 4 comprises an endless conveyor 10 defined by an endless belt 11 having a substantially rectangular section, and two opposite major lateral surfaces, one of which is a conveying surface 12 for supporting cigarettes 6 as they are fed through store 4. Conveyor 10 comprises a conveying branch 13 which, together with input conveyor 5 and output conveyor 7, defines a feed path for cigarettes 6 between manufacturing machine 2 and packing machine 3, extends from an input pulley 14 at input station 8 to an output pulley 15 at output station 9, and feeds cigarettes 6 from input station 8 to output station 9. Conveyor 10 also comprises a return branch 16 extending from output pulley 15 to input pulley 14.

Store 4 comprises an adjusting assembly 17 for adjusting the length of conveying branch 13 and the length of return branch 16 in complementary manner, so as to adjust the storage capacity of store 4, and which comprises an adjusting device 18 associated with conveying branch 13, and a compensating device 19 associated with return branch 16.

Adjusting device 18 comprises a fixed frame defined by a parallelepiped-shaped box body 20 (FIG. 3), the top surface of which has a straight guide 21 extending between input station 8 and output station 9, and on which runs a slide 22 supporting a movable drum 23 with a vertical axis 24. Straight guide 21 also supports a fixed drum 25 which is connected rigidly to straight guide 21, has a vertical axis 26, and is located close to input station 8.

Compensating device 19 is housed entirely inside box body 20 underneath adjusting device 18. More specifically, compensating device 19 comprises two fixed, coaxial drums 27 having respective horizontal axes and connected rigidly to guide 21 at fixed drum 25; and two movable, coaxial drums 28 having respective horizontal axes and mounted on a slide 29 running along a bottom portion of guide 21. More specifically, straight guide 21 is defined by a square-section beam, a top portion of which supports drum 25 and, by means of slide 22, drum 23, and a bottom portion of which supports fixed drums 27 and, by means of slide 29, movable drums 28.

Slide 22 supporting movable drum 23, and slide 29 supporting movable drums 28 are connected mechanically to each other by a connecting device (not shown in detail) designed so that each movement of slide 22 corresponds to an identical movement of slide 29 in the opposite direction.

Input pulley 14 is rotated by an actuating device 30 about a respective horizontal axis to drive belt 11 at input station 8, and output pulley 15 is rotated by an actuating device 31 about a respective horizontal axis to drive belt 11 at output station 9.

Along conveying branch 13 of conveyor 10, belt 11 winds downwards about both drums 23 and 25 to form a vertical coil, each turn of which is supported by drums 23 and 25. Along conveying branch 13, belt 11 is positioned with conveying surface 12 facing upwards, and, along the coil, is positioned on edge with respect to drums 23 and 25, and rests flat on the outer surfaces of drums 23 and 25. Along return branch 16 of conveyor 10, belt 11 winds about drums 27 and 28 to form a horizontal coil.

In actual use, cigarettes 6 are fed continuously onto conveying branch 13 of conveyor 10 at input station 8, and are fed by conveying branch 13 to output station 9 where the first cigarettes into store 4 are fed out of store 4.

In normal operating conditions, the number of cigarettes 6 fed to input station 8 equals the number of cigarettes 6 leaving output station 9 of conveyor 10, so that actuating device 30 at input station 8 drives belt 11 at the same speed as actuating device 31 at output station 9, and the distance between drums 23 and 25 is unchanged.

In the event more cigarettes 6 are fed to input station 8 than are absorbed at output station 9, actuating device 30 at input station 8 drives belt 11 faster than actuating device 31 at output station 9, so that movable drum 23 moves away from fixed drum 25, thus increasing the length of conveying branch 13; and, to compensate for the increase in the length of conveying branch 13, movable drums 28 move towards fixed drums 27 to make a complementary reduction in the length of return branch 16. In other words, in the event more cigarettes 6 are fed to input station 8 than are absorbed at output station 9, input pulley 14 drives belt 11 faster than output pulley 15, so that movable drums 28 mounted on slide 29 are drawn towards fixed drums 27, thus reducing the length of return branch 16; and, by virtue of the connecting device, movement of slide 29 corresponds to an equal movement in the opposite direction of slide 22, which increases the distance between movable drum 23 and fixed drum 25, thus increasing the length of conveying branch 13 to compensate for the reduction in the length of return branch 16.

Conversely, when fewer cigarettes 6 are fed to input station 8 than are absorbed at output station 9, actuating device 30 at input station 8 drives belt 11 at a slower speed than actuating device 31 at output station 9, so that movable drum 23 moves towards fixed drum 25, thus reducing the length of conveying branch 13; and, to compensate for the reduction in the length of conveying branch 13, movable drums 28 move away from fixed drums 27 to make a complementary increase in the length of return branch 16. In other words, when fewer cigarettes 6 are fed to input station 8 than are absorbed at output station 9, input pulley 14 drives belt 11 at a slower speed than output pulley 15, so that movable drum 23 mounted on slide 22 is drawn towards fixed drum 25, thus reducing the length of conveying branch 13; and, by virtue of the connecting device, movement of slide 22 corresponds to an equal movement in the opposite direction of slide 29, which increases the distance between fixed drums 27 and movable drums 28, thus increasing the length of return branch 16 to compensate for the reduction in the length of conveying branch 13.

It should be pointed out that the lengths of conveying branch 13 and return branch 16 are adjusted by simply tensioning belt 11 by means of actuating device 30 connected to input pulley 14, and actuating device 31 connected to output pulley 15. Since the function of the connecting device, of relating the movement of movable drum 23 (slide 22) to that of movable drums 28 (slide 29), would anyway be performed automatically, in the event of a difference in speed between input pulley 14 and output pulley 15, by virtue of the structure of conveyor 10, the connecting device provides solely for making the connection between the movement of movable drum 23 and that of movable drums 28 easier, and is therefore optional.

Figure 3:
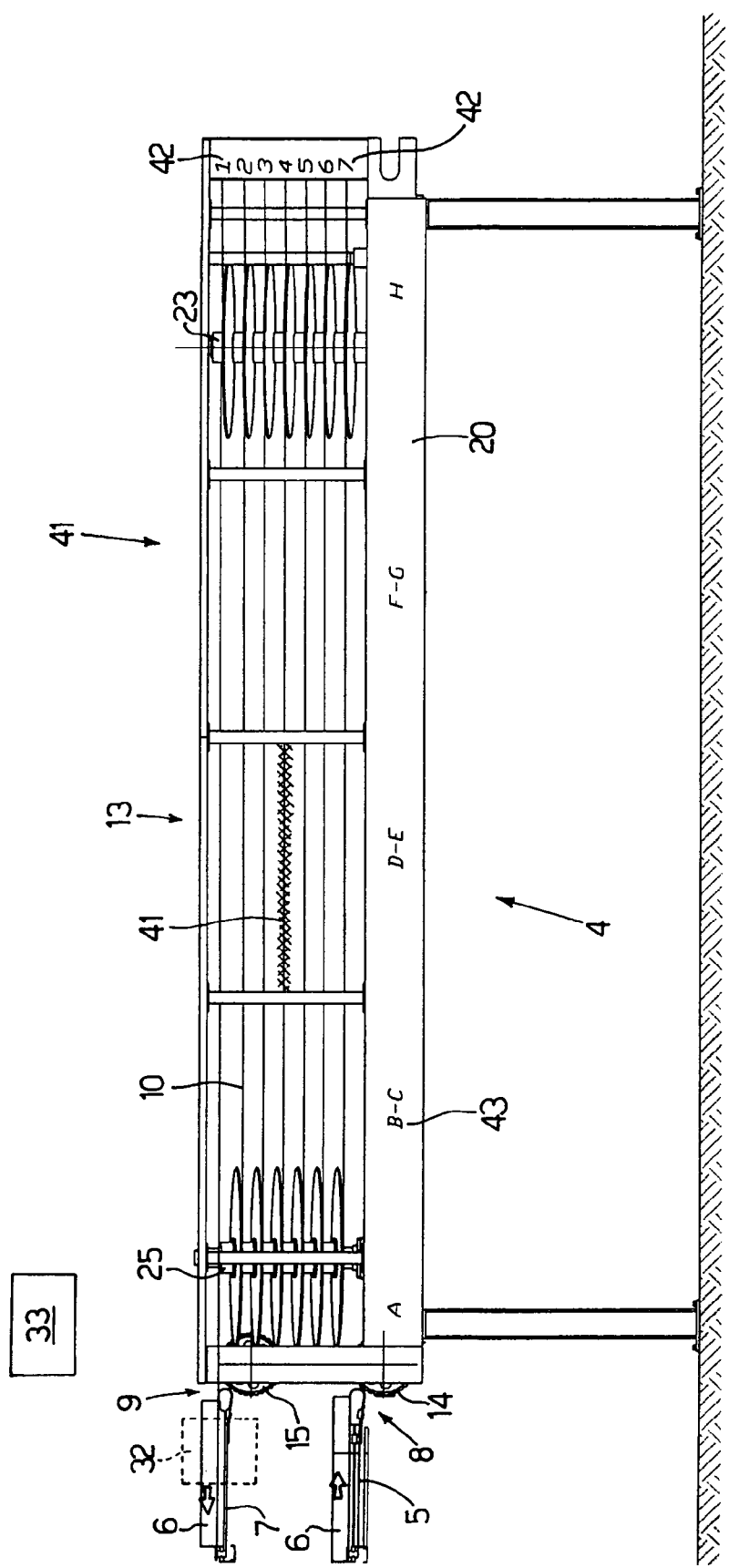
FIG. 3 shows a side view of the FIG. 1 store.

As shown in FIGS. 1 and 3, store 4 comprises an expulsion station 32 located along output conveyor 7, immediately downstream from output station 9, to expel a given mass of cigarettes 6 from output conveyor 7; and a control unit 33 for identifying the location of a mass of cigarettes 6 in store 4, and activating expulsion station 32 as the previously identified mass of cigarettes 6 travels through expulsion station 32. In other words, control unit 33 identifies a given mass of cigarettes 6 on conveying branch 13 of store 4, and tracks the movement of the mass of cigarettes 6 through store 4 until the mass of cigarettes 6 comes out of store 4 and travels through expulsion station 32; at which point, control unit 33 activates expulsion station 32 to expel the previously identified mass of cigarettes 6. As explained in more detail later on, a mass of cigarettes 6 to be expelled may be identified either manually, i.e. by the operator entering the current location of the mass of cigarettes 6 to be expelled in control unit 33, or automatically by control unit 33.

Figure 4:
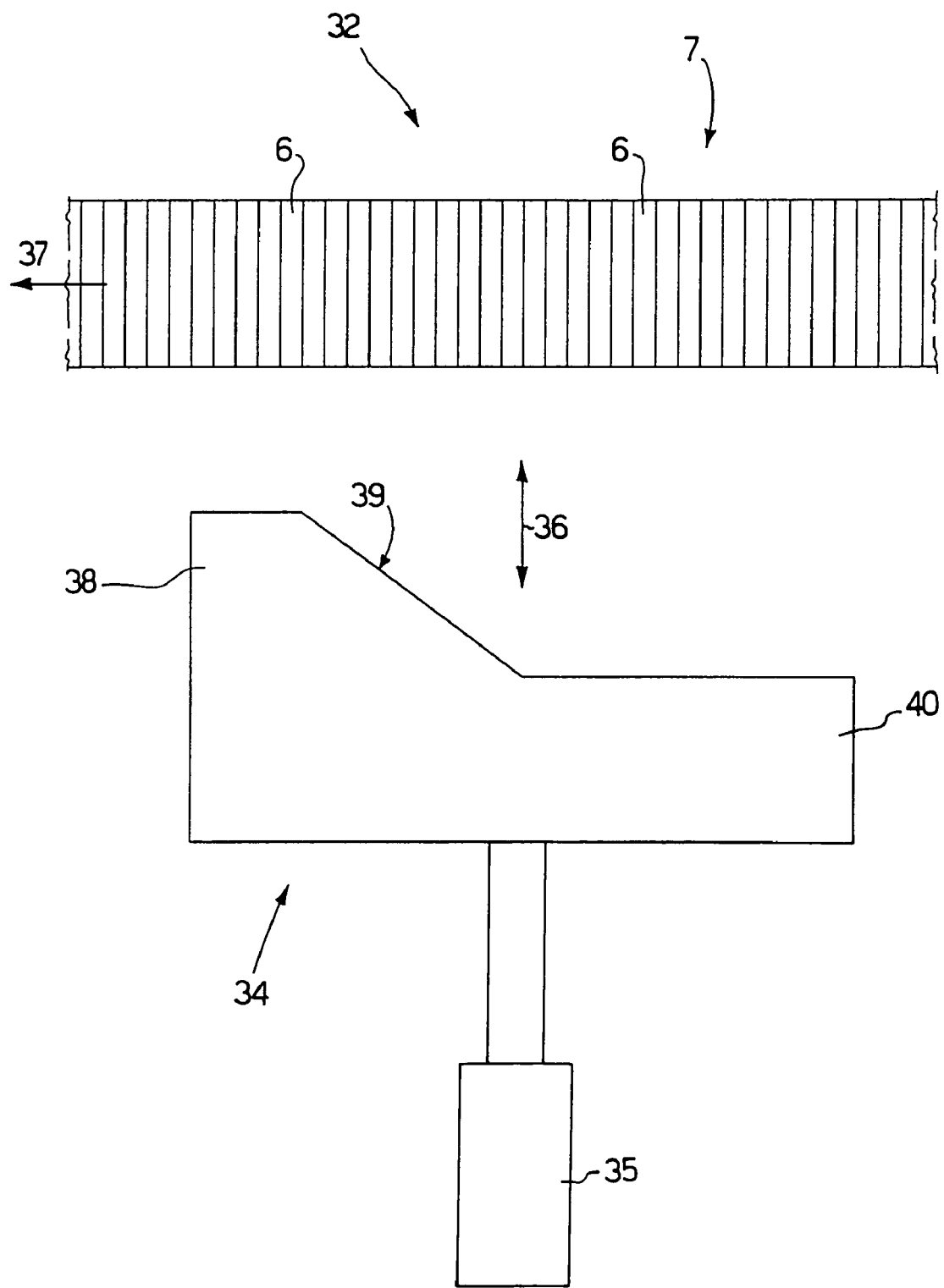
FIG. 4 shows a plan view of an expulsion station of the FIG. 1 store.
Figure 5:
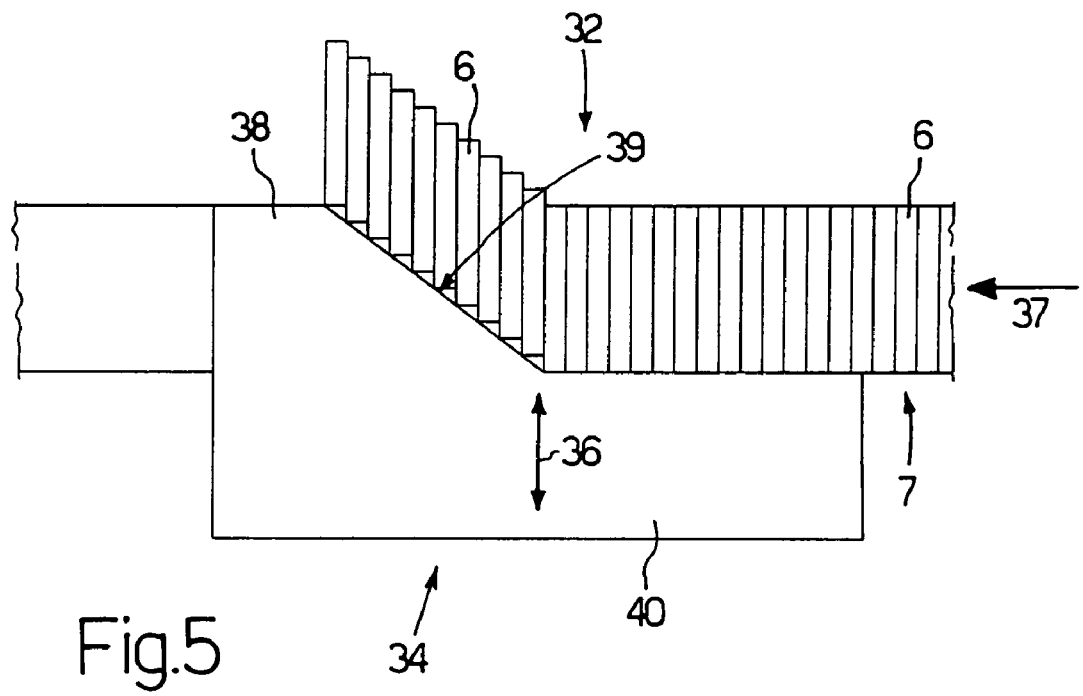
FIGS. 5 and 6 show two plan views of the FIG. 4 expulsion station in two different operating configurations.
Figure 6:
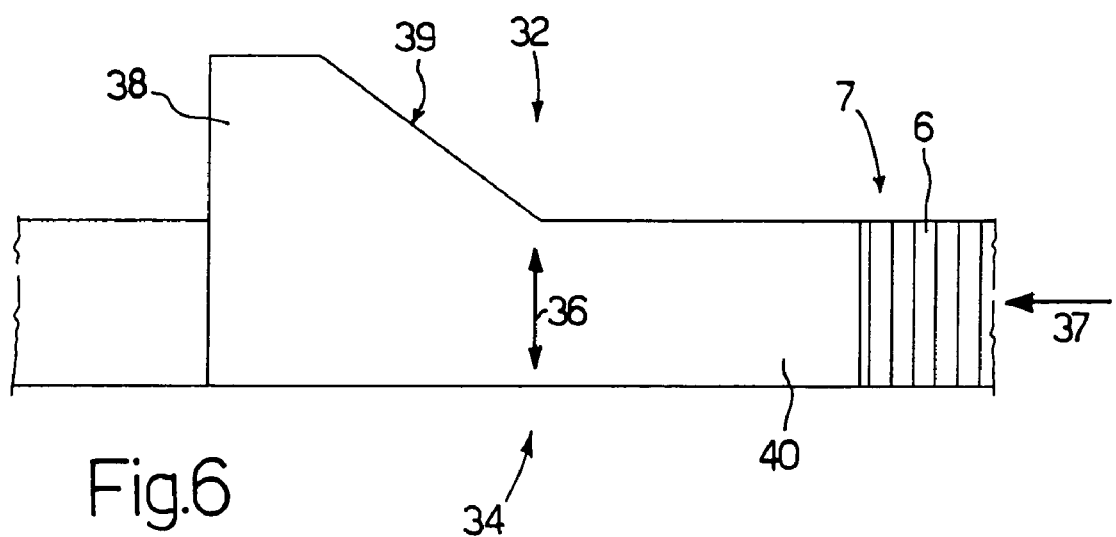

As shown in FIG. 4, expulsion station 32 comprises a diverting member 34; and an actuator 35 for moving diverting member 34, in a direction 36 perpendicular to the travelling direction 37 of output conveyor 7, between an idle position (FIG. 4) in which diverting member 34 is located outside the path of cigarettes 6 on output conveyor 7, and a work position (FIGS. 5 and 6) in which diverting member 34 is located along the path of cigarettes 6 on output conveyor 7, to intercept cigarettes 6 on output conveyor 7 and push cigarettes 6 off output conveyor 7. A bin (not shown) for receiving the cigarettes 6 expelled at expulsion station 32 is normally provided underneath output conveyor 7 at expulsion station 32.

Diverting member 34 preferably comprises a wedge-shaped body 38 having a sloping surface 39 sloping with respect to the travelling direction 37 of output conveyor 7; and a parallelepiped-shaped body 40 alongside and upstream from wedge-shaped body 38 in the travelling direction 37 of output conveyor 7.

In actual use, to expel a mass of cigarettes 6 from output conveyor 7, diverting member 34 is moved from the idle position (FIG. 4) to a first work position (FIG. 5) in which sloping surface 39 of wedge-shaped body 38 gradually pushes cigarettes 6, carried on output conveyor 7, off output conveyor 7. Diverting member 34 is kept in the first work position (FIG. 5) for as long as it takes to expel the targeted mass of cigarettes 6; after which, diverting member 34 is moved rapidly from the first work position to a second work position (FIG. 6) and then back to the idle position (FIG. 4). In the first work position (FIG. 5), parallelepiped-shaped body 40 is located outside the path of cigarettes 6 on output conveyor 7, and, in the second work position (FIG. 6), is located along the path of cigarettes 6 on output conveyor 7.

To enable the operator to command expulsion by control unit 33 of a mass of cigarettes 6 along conveying branch 13 of store 4, conveying branch 13 is divided into a number of sections 41, each identified by respective coordinates comprising a quantity 42 indicating a vertical level along vertical axes 24 and 26 of drums 23 and 25, and a quantity 43 indicating a horizontal location between vertical axes 24 and 26 of drums 23 and 25. More specifically, quantities 42 and 43 are printed clearly on the walls of store 4 (FIG. 3) where they are clearly visible by the operator. In the embodiment shown in the accompanying drawings, quantity 42 ranges discretely between a value 1 and a value 7, and quantity 43 ranges discretely between a value A and a value H. By way of example, the criss-cross hatching in FIG. 3 indicates a mass of cigarettes 6 in the location identified by coordinates E-4.

Store 4 is normally located at least 185–220 cm off the floor, so that two raised walkways (not shown) may be provided alongside store 4 and parallel to conveying branch 13 to give the operator a comfortable, close-up view of conveying branch 13.

In an alternative embodiment not shown, a control station is set up upstream from expulsion station 32 to control the quality of cigarettes 6 and activate expulsion station 32 to expel any masses containing faulty cigarettes 6.

As shown in FIG. 2, conveyor 10 is powered by actuating device 30 rotating input pulley 14, and by actuating device 31 rotating output pulley 15. Input pulley 14 is fitted with an angular encoder 44 for transmitting the angular position of pulley 14 to control unit 33, and output pulley 15 is fitted with an angular encoder 45 for transmitting the angular position of output pulley 15 to control unit 33. The signals from encoders 44 and 45 are used by control unit 33 to control actuating devices 30 and 31, as well as for determining the instantaneous position of belt 11 of conveyor 10.

Control unit 33 needs to know the instantaneous position of belt 11 of conveyor in order to determine the current location of a mass of cigarettes 6 to be expelled and when the mass of cigarettes 6 to be expelled is located at expulsion station 32.

It is important to note that, expulsion station 32 being located immediately downstream from output station 9, i.e. close to output pulley 15, and output conveyor 7 necessarily running at substantially the same speed as belt 11 at output station 9, control unit 33 need not necessary know the exact instantaneous position of output conveyor 7, and, in view of the location of expulsion station 32, may activate the expulsion station as soon as or just before the cigarettes 6 to be expelled travel through output station 9. If expulsion station 32 is not located immediately downstream from output station 9, control unit 33 may need to also real-time determine the instantaneous position of output conveyor 7 by means, for example, of a further encoder connected to a pulley of output conveyor 7.

Due to read errors by encoders 44 and 45 and slippage between belt 11 and input and output pulleys 14 and 15, errors may be made by control unit 33 in determining the instantaneous position of belt 11 of conveyor 10, which errors tend to increase with time. To eliminate, at regular intervals, any errors made by control unit 33 in determining the instantaneous position of belt 11 of conveyor 10, belt 11 may be provided with at least one marker (not shown) whose passage is detected by a detection station (not shown).

On detecting passage of the marker at a given location, the detecting station supplies control unit 33 with a reference signal of the actual position of belt 11 of conveyor 10 to allow control unit 33 to eliminate any errors. In various embodiments, the marker may be optical, magnetic, or a transponder.

Expulsion station 32 as described above provides for eliminating from production flow a mass of cigarettes 6 identifiable simply and clearly while on conveying branch 13 of store 4. Which possibility is extremely useful, seeing as cigarettes 6 travel along conveying branch 13 at slow speed, and at any rate at a much slower speed than through manufacturing machine 2 and packing machine 3.

Store 4 as described above may obviously be used to store other than cigarettes 6, e.g. filter portions, packets of cigarettes, confectionary, or semifinished parts of the manufacturing or metalworking industry.

The invention claimed is:

1. A variable-capacity First In First Out (FIFO) store comprising
   an input station (8) located at an input conveyor (5);
   an output station (9) located at an output conveyor (7);
   a powered endless conveyor belt (10) defining a conveying branch (13) for transferring a mass of articles (6) from the input station (8) to the output station (9), and a return branch (16) extending from the output station (9) to the input station (8);
   an adjusting assembly (17) for adjusting the lengths of the conveying and return branches (13, 16) in complementary manner, so as to adjust the storage capacity of the store (4);
   an expulsion station (32) located along the output conveyor (7), downstream from the output station (9), to expel a given mass of articles (6) from the output conveyor (7); and
   a control unit (33) for tracking the location of a mass of articles (6) in the store (4), and for activating the expulsion station (32) when the previously identified mass of articles (6) travels through the expulsion station (32);
   wherein the conveyor belt (10) is connected to at least one respective encoder (44, 45) for determining the instantaneous position of the conveyor belt (10); the control unit (33) being connected to the encoder (44, 45) of the conveyor belt (10) to track, in the store (4), the location of a mass of articles (6) to be expelled, and to determine when the previously identified mass of articles (6) travels through the expulsion station (32).

2. A store as claimed in claim 1, wherein the expulsion station comprises a diverting member (34); and an actuator (35) for moving the diverting member (34), in a direction (36) perpendicular to the travelling direction (37) of the output conveyor (7), between an idle position in which the diverting member (34) is located outside a path of the output conveyor (7), and a first work position in which the diverting member (34) is located along the path of the output conveyor (7) to intercept the articles (6) on the output conveyor (7) and push the articles (6) off the output conveyor (7).

3. A store as claimed in claim 2, wherein the diverting member (34) comprises a wedge-shaped body (38) having a sloping surface (39) sloping with respect to the travelling direction (37) of the output conveyor (7); when the diverting member (34) is in the first work position, the sloping surface (39) of the wedge-shaped body (38) is positioned to gradually push the articles (6), carried on the output conveyor (7), off the output conveyor (7).

4. A store as claimed in claim 3, wherein the diverting member (34) comprises a parallelepiped-shaped body (40) alongside the wedge-shaped body (38) and upstream from the wedge-shaped body (38) in the travelling direction (37) of the output conveyor (7); in the first work position, the parallelepiped-shaped body being located outside the path of the output conveyor (7), and, in a second work position, the parallelepiped-shaped body being located along the path of the output conveyor (7); in actual use, the diverting member (34) being moved from the idle position to the first work position, being maintained in the first work position for as long as it takes to expel the mass of articles (6) to be expelled, and, following expulsion, being moved rapidly from the first work position to the second work position, and then back to the idle position.

5. A store as claimed in claim 1, wherein the conveying branch (13) is divided into a number of sections (41), each identified by respective coordinates (42, 43) to enable an operator to communicate to the control unit (33) identification and subsequent expulsion of all the articles (6) within a given section (41).

6. A store as claimed in claim 5, wherein the coordinates (42, 43) are indicated in a fixed position on the store (4), so as to be visible by an operator.

7. A store as claimed in claim 6, wherein the conveying branch (13) forms at least one first coil about at least one pair of first drums (23, 25) having vertical axes (24, 26); the coordinates (42, 43) comprising a first quantity (42) indicating a vertical level along the vertical axes (24, 26) of the first drums (23, 25), and a second quantity (43) indicating a horizontal location between the vertical axes (24, 26) of the first drums (23, 25).

8. A store as claimed in claim 1, wherein a control station is located upstream from the expulsion station (32) to control the quality of the articles (6), and to command operation of the expulsion station (32) to expel any faulty articles (6).

9. A store as claimed in claim 1, wherein the conveyor belt (10) has at least one marker; and a detection station for detecting passage of the marker, and for supplying the control unit (33) with a reference signal of the actual position of the conveyor belt (10).

10. A store as claimed in claim 9, wherein the marker is optical.

11. A store as claimed in claim 9, wherein the marker is magnetic.

12. A store as claimed in claim 9, wherein the marker is a transponder.

13. A store as claimed in claim 1, wherein the conveying branch (13) forms at least one first coil about at least one pair of first drums (23, 25), and the return branch (16) forms at least one second coil about at least one pair of second drums (27, 28).

14. A store as claimed in claim 13, wherein the second drums (27, 28) are perpendicular to the first drums (23, 25).

15. A store as claimed in claim 1, wherein the store (4) is located at least 185 cm off the floor; two raised walkways being provided alongside the store (4) and parallel to the conveying branch (13) to give an operator a comfortable, close-up view of the conveying branch (13).

16. A store as claimed in claim 1, wherein the expulsion station (32) is located immediately downstream from the output station (9).

17. A variable-capacity First In First Out (FIFO) store comprising:
an input station (8) located at an input conveyor (5);
an output station (9) located at an output conveyor (7);
a powered endless conveyor belt (10) defining a conveying branch (13) for transferring a mass of articles (6) from the input station (8) to the output station (9), and a return branch (16) extending from the output station (9) to the input station (8);
an adjusting assembly (17) for adjusting the lengths of the conveying and return branches (13, 16) in complementary manner, so as to adjust the storage capacity of the store (4);
an expulsion station (32) located along the output conveyor (7), downstream from the output station (9), to expel a given mass of articles (6) from the output conveyor (7); and
a control unit (33) for tracking the location of a mass of articles (6) in the store (4), and for activating the expulsion station (32) when the previously identified mass of articles (6) travels through the expulsion station (32);
wherein the conveying branch (13) is divided into a number of sections (41), each identified by respective coordinates (42, 43) to enable an operator to communicate to the control unit (33) identification and subsequent expulsion of all the articles (6) within a given section (41).

18. A store as claimed in claim 17, wherein the coordinates (42, 43) are indicated in a fixed position on the store (4), so as to be visible by an operator.

19. A store as claimed in claim 18, wherein the conveying branch (13) forms at least one first coil about at least one pair of first drums (23, 25) having vertical axes (24, 26); the coordinates (42, 43) comprising a first quantity (42) indicating a vertical level along the vertical axes (24, 26) of the first drums (23, 25), and a second quantity (43) indicating a horizontal location between the vertical axes (24, 26) of the first drums (23, 25).

20. A variable-capacity First In First Out (FIFO) store located at least 185 cm off the floor and comprising
an input station (8) located at an input conveyor (5);
an output station (9) located at an output conveyor (7);
a powered endless conveyor belt (10) defining a conveying branch (13) for transferring a mass of articles (6) from the input station (8) to the output station (9), and a return branch (16) extending from the output station (9) to the input station (8);

an adjusting assembly (17) for adjusting the lengths of the conveying and return branches (13, 16) in complementary manner, so as to adjust the storage capacity of the store (4);

an expulsion station (32) located along the output conveyor (7), downstream from the output station (9), to expel a given mass of articles (6) from the output conveyor (7);

a control unit (33) for tracking the location of a mass of articles (6) in the store (4), and for activating the expulsion station (32) when the previously identified mass of articles (6) travels through the expulsion station (32); and two raised walkways provided alongside the store (4) and parallel to the conveying branch (13) to give an operator a comfortable, close-up view of the conveying branch (13).

\* \* \* \* \*

UNITED STATES PATENT AND TRADEMARK OFFICE
CERTIFICATE OF CORRECTION

PATENT NO. : 7,163,098 B2
APPLICATION NO. : 11/065884
DATED : January 16, 2007
INVENTOR(S) : Michelle Ferrari, Sauro Uccellari and Alessandro Minarelli It is certified that error appears in the above-identified patent and that said Letters Patent is hereby corrected as shown below:

Title Page; should read;
(73) Assignee: G.D Societa' per Azioni (IT)

Signed and Sealed this

Fifth Day of June, 2007

JON W. DUDAS
*Director of the United States Patent and Trademark Office*